United States Patent Office 3,256,739
Patented June 21, 1966

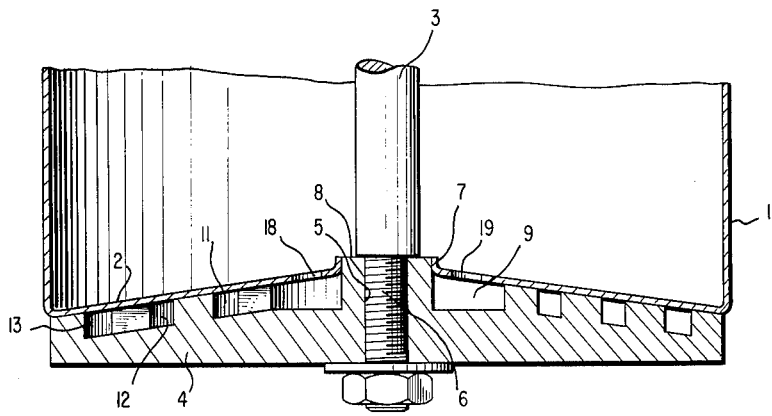
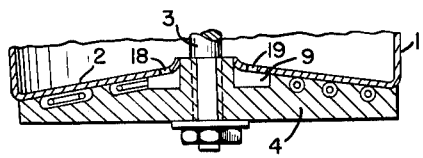
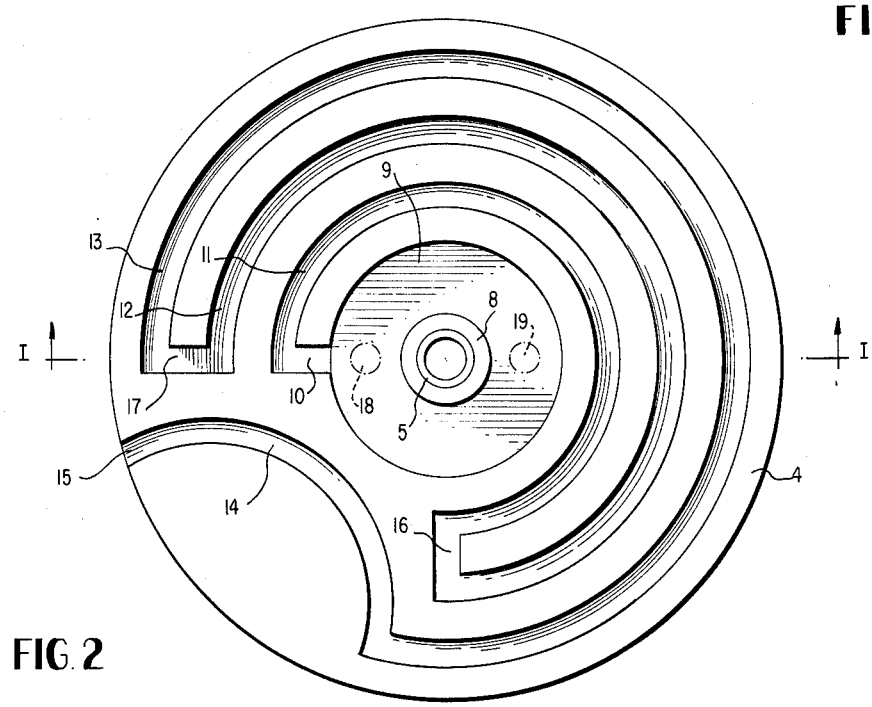
INVENTORS
WERNER H. KOHLER
GERHARD DRUECKER
RICHARD SILBER

3,256,739
FLUID LEVEL INDICATOR
Werner H. Köhler, Stuttgart-Degerloch, Gerhard Drücker, Stuttgart, and Richard Silber, Unterensingen, Germany, assignors to Daimler-Benz Aktiengesellschaft, Stuttgart-Unterturkheim, Germany
Filed June 3, 1963, Ser. No. 284,993
Claims priority, application Germany, June 5, 1962, D 39,088
10 Claims. (Cl. 73—305)

The present invention relates to an improvement and further development of liquid level indicators, especially in connection with tanks for motor vehicles, each provided as measurement transmitter with a float, arranged within a vertical immersed tube or dip pipe, the movements of which are damped by a throttling connection with the tank provided at the lower end of the immersed pipe.

The present invention essentially consists in providing as damping installation at the lower end of the immersed tube or dip pipe a continuous overflow channel or passage disposed approximately in one plane, especially placed over a relatively flat conical surface, which has a number of turns or convolutions, reversing sections and/or chambers producing a predetermined flow resistance. The overflow channel or passage may be formed by a small tubular member, especially made of plastic material or also by an open bottom groove which is transformed into a cross section closed on all sides thereof by means of a cover.

As compared to the known prior art damping installations consisting of small bottom apertures which, for the most part, are additionally covered by a fine-mesh screen, the arrangement according to the present invention offers the advantage that it does not become as easily clogged, may be cleaned more readily and, in particular, when made of plastic material, can be manufactured in a more simple and less-expensive manner. A particular advantage of the present invention resides in the fact that, for example, with an electrical indicator of the tank content, the point of time of lighting up of the indicator lamp indicating the need for refueling can be adjusted very accurately and the indicator lamp lacks any tendency to flicker when the limit range of the fuel reserve quantity is reached; and more particularly, such flickering tendency is also absent with the present invention when the tank content is subjected, during hard braking or acceleration, as well as during uphill or downhill drives or while driving through curves, to very strong fluctuations and tilting of the liquid level.

Accordingly, it is an object of the present invention to provide a liquid level indicator, especially for motor vehicle tanks which eliminates by simple means the disadvantages and shortcomings encountered with the prior art constructions.

It is another object of the present invention to provide liquid level indicator installations which may be manufactured by simple means, may be readily installed, and are less costly than the known devices as regards manufacture and installation thereof.

Another object of the present invention resides in the provision of a damping arrangement at the bottom of the dip pipe of a liquid level indicator immersed into a fuel tank of a vehicle which assures reliable operation under all driving conditions of the vehicle, and in particular effectively prevents fluctuations in the indicator as a result of sudden accelerations or decelerations, centrifugal forces, or non-level rides of the vehicle.

Another object of the present invention resides in the provision of a damping installation for fluid level indicators which does not become as easily clogged up as the prior art installations and additionally lends itself more readily to cleaning, in case of need.

A further object of the present invention resides in the provision of a damping installation for liquid level indicators, especially those utilizing an indicator lamp, which is so constructed and arranged as to prevent flickering of the light, even when the tank content reaches the limit range of the reserve fuel quantity.

These and other objects, features and advantages of the present invention will become more obvious from the following description when taken in connection with the accompaying drawing which shows, for purposes of illustration only one embodiment in accordance with the present invention, and wherein:

FIGURE 1 is a partial axial cross-sectional view through the lower end of an immersed tube or dip pipe of a liquid level indicator in accordance with the present invention; and FIGURE 2 is a top plan view of the bottom attachment of the immersed tube or dip pipe of FIGURE 1.

FIGURE 3 is a partial sectional view similar to FIGURE 1 of another embodiment of the invention.

Referring now to the drawing wherein like reference numerals are used throughout the two views to designate like parts, reference numeral 1 is used therein to designate the immersed tube or dip pipe that extends in a manner, well known per se, into the fuel tank with the bottom thereof. The pipe 1 is provided with a bottom portion 2. The guide shaft for the float (not shown) of conventional construction is designated by reference numeral 3. According to the present invention, the bottom portion 2 forms a relatively flat cone extending into the immersed tube or dip pipe 1; a similarly shaped bottom attachment 4 is accommodated from below within the conically shaped bottom portion 2 of pipe 1 whereby the attachment 4 abuts against the lower outer surface of the conically shaped bottom portion 2. The bottom attachment 4 is, in turn, provided either with a centering bore or with a central threaded bore 5. The float guide shaft 3 is threadably inserted into the threaded bore 5, and the end 6 of the threaded shaft 5 extending below the bottom side of the attachment 4 serves simultaneously for purposes of securing the bottom attachment 4 by means of a lock-nut. The bottom portion 2 of the pipe 1 is provided with a central and concentric centering collar 7 into which engages the central and concentric threaded bushing 8 of the bottom attachment 4. The bushing 8 is surrounded by a shallow cylindrical annular space 9 which is in communication by way of a radial groove 10 branching off from the annular space 9 with a plurality of circularly or ring-shaped groove sections 11, 12 and 13, and the outermost section 13 of which terminates and discharges by way of a curved groove 14 at 15 along the circumference of the bottom attachment 4. The ring-shaped groove sections 11, 12 and 13 are, in turn, connected with each other by radial groove sections 16 and 17, respectively. All of the grooves of the bottom attachment 4 are effectively covered by the bottom portion 2 of the immersed pipe 1. Consequently, these grooves form a relatively long flow path which changes its direction several times from the central space 9 to the outermost end 15 thereof. The thus-formed channel is in communication with the immersed pipe 1 by way of one or several apertures 18, 19 provided within the bottom portion 2 above the space 9.

*Operation*

The operation of the device according to the present invention is believed readily understood from a consideration of the drawing, especially of FIGURE 2 thereof. Liquid level fluctuations of the tank content become effective on the float (not shown) within the immersed tube or dip pipe 1, at worst, only with relatively long delays by reason of the relatively long flow path of the ring-shaped channels and only in a very strongly damped manner by reason of the relatively large flow resistance, and for all practical purposes, are no longer effective at all on the float measurement transmitter; more particularly, this is also the case, that is, these fluctuations are also practically ineffectual when the tank liquid level has already dropped to the limit of the reserve quantity of fuel.

The bottom attachment 4 may consist of metal or plastics. It is also possible, as seen in FIGURE 3 to replace the grooves 11 to 14 and possibly also grooves 10, 16 and 17 by a small tubular member placed upon or displaced into the bottom part 4. Such an arrangement is of advantage when the immersed pipe 1 is normally open at the bottom thereof and the bottom part 4 is attached to the lower pipe end 1, for example, in the form of a cap or is secured thereto as attachment within the pipe 1. Additionally, the shapes and contours of the channels 10 to 14 and/or 10, 16 and 17 are not limited to those shown and described herein. Instead, they may be varied at will, it being essential only in each case that the channel offers an increased flow resistance from the inside toward the outside, and vice versa, which suppresses in an effective manner the influence of tank liquid level fluctuations in the inside of the immersed pipe 1. Thus, according to the present invention, the channel may also be arranged, for example, in the form of a tight spiral. The form of the ring-shaped sections, however, facilitates the manufacture thereof. Additionally, within the scope of the present invention, the pipe 1 and the bottom part 4 may also be made in one piece. While the cross-sectional dimensions of the overflow passage may be varied at will to suit the particular needs, the cross-sectional area of the overflow passage according to the present invention is preferable approximately 2 mm.² The transmission of the measured value between the float and the fuel tank content indicator in the driver compartment may be, for purposes of the present invention, of any known conventional construction. Preferred, however, is an indicator, known per se, with an electrical warning lamp arranged within the field of vision of the driver, for example, at the dashboard or instrument panel. The present invention is of particular advantage for such an arrangement because it can be very accurately adjusted and matched to the predetermined reserve content of the tank, and the warning lamp also does not flicker within the limit range of the reserve quantity of the fuel. With such an arrangement, the float transmitter may be constructed as a contact cooperating with a sliding contact for the electrical indicator installation, as is well known in the art. Possibly a certain predetermined matching of the throttling effect may also be achieved by arranging within the extent of the channel one or several liquid calming chambers.

While we have shown and described one embodiment according to the present invention, it is obvious from the foregoing that it is not limited to the details shown and described herein but is susceptible of numerous changes and modifications within the spirit and scope thereof, as known to a person skilled in the art, and we, therefore, do not wish to be limited to the details shown and described herein but intend to cover all such changes and modifications as are encompassed by the scope of the appended claims.

We claim:

1. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:
   throttling means connected to said pipe structure operable to effect communication between the lower end of the pipe structure and the interior of the surrounding tank for damping the movements of said float-type transmitter,
   said throttling means including continuous channel means arranged in a substantially common plane, said channel means having a plurality of at least partial turns, reversing places and collecting chamber means producing a predetermined flow resistance.

2. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:
   throttling means connected to said pipe structure operable to effect communication between the lower end of the pipe structure and the interior of the surrounding tank for damping the movements of said float-type transmitter,
   said throttling means including continuous channel means arranged in a substantially common plane, said channel means having a plurality of at least partial turns, reversing places and collecting chamber means producing a predetermined flow resistance,
   said channel means being constituted by a relatively thin tubular member.

3. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:
   throttling means connected to said pipe structure operable to effect communication between the lower end of the pipe structure and the interior of the surrounding tank for damping the movements of said float-type transmitter,
   said throttling means including continuous channel means arranged in a substantially common plane, said channel means having a plurality of at least partial turns, reversing places and collecting chamber means producing a predetermined flow resistance,
   said channel means being constituted effectively by a groove within a bottom member which is open at the top, is installed into the bottom of the pipe structure, and is closed by a cover to form a channel with a cross section closed on all sides.

4. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:
   throttling means connected to said pipe structure operable to effect communication between the lower end of the pipe structure and the interior of the surrounding tank for damping the movements of said float-type transmitter,
   said throttling means including continuous channel means arranged in a substantially common plane, said channel means having a plurality of at least partial turns, reversing places and collecting chamber means producing a predetermined flow resistance,
   a bottom member accommodating therein said channel means and constructed as a separate bottom part, separate from said pipe structure.

5. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:

throttling means connected to said pipe structure operable to effect communication between the lower end of the pipe structure and the interior of the surrounding tank for damping the movements of said float-type transmitter, said throttling means including continuous channel means arranged in a substantially common plane, said channel means having a plurality of at least partial turns, reversing places and collecting chamber means producing a predetermined flow resistance, a bottom member accommodating therein said channel means and constructed as a separate bottom part, separate from said pipe structure, means for securing said bottom part to the lower side of said pipe structure, and bore means operatively connecting said channel means with the inside of said pipe structure.

6. In a liquid level indicator installation, especially for tanks in motor vehicles, in which an approximately vertical pipe extends to within the bottom of the tank and accommodates therein a float member whose movements produce the liquid level indication and whose movements are damped by a throttling connection with the tank which is arranged at the lower immersed pipe end, the improvement essentially consisting of a damping installation connected to said vertical pipe which comprises a continuous duct arranged in a substantially common plane including a plurality of duct sections forming at least some of winding, reversing place and collecting chamber means producing a predetermined flow resistance providing a communication between the lower end of said pipe and the interior of the surrounding tank.

7. In a liquid level indicator installation, especially for tanks in motor vehicles, in which an approximately vertical pipe extends to within the bottom of the tank and accommodates therein a float member whose movements produce the liquid level indication and whose movements are damped by a throttling connection with the tank which is arranged at the lower immersed pipe end, the improvement essentially consisting of a damping installation formed by a bottom element connected to said vertical pipe which comprises a continuous duct including a plurality of duct sections forming at least some of winding, reversing place and collecting chamber means producing a predetermined flow resistance providing communication between the lower end of said pipe and the interior of the surrounding tank, said pipe being provided with a bottom portion, and said bottom portion as well as the surface of said bottom element being in the form of a relatively flat cone.

8. In a liquid level indicator installation, especially for tanks in motor vehicles, in which an approximately vertical pipe extends to within the bottom of the tank and accommodates therein a float member whose movements produce the liquid level indication and whose movements are damped by a throttling connection with the tank which is arranged at the lower immersed pipe end, the improvement essentially consisting of a damping installation formed by a bottom element connected to said vertical pipe which comprises a continuous duct including a plurality of duct sections forming at least some of winding, reversing place and collecting chamber means producing a predetermined flow resistance providing communication between the lower end of said pipe and the interior of the surrounding tank, said pipe being provided with a bottom portion, and said bottom portion as well as the surface of said bottom element being in the form of a relatively flat cone, said duct being formed by grooves provided in the said bottom element surface and by said bottom portion forming a cover ttherefor.

9. In a liquid level indicator installation, especially for tanks in motor vehicles, in which an approximately vertical pipe extends to within the bottom of the tank and accommodates therein a float member whose movements produce the liquid level indication and whose movements are damped by a throttling connection with the tank which is arranged at the lower immersed pipe end, the improvement essentially consisting of a damping installation formed by a bottom element connected to said vertical pipe which comprises a continuous duct including a plurality of duct sections forming at least some of winding, reversing place and collecting chamber means producing a predetermined flow resistance providing communication between the lower end of said pipe and the interior of the surrounding tank, said pipe being provided with a bottom portion, and said bottom portion as well as the surface of said bottom element being in the form of a relatively flat cone, said duct being formed by grooves provided in the said bottom element surface and by said bottom portion forming a cover therefor, and bore means in said bottom portion providing a communication between the inside of said pipe and said duct.

10. A liquid level indicator, especially for tanks in motor vehicles, which utilizes a float-type measurement transmitter means arranged within a substantially vertical immersed pipe structure whereby the movements of said float-type transmitter means are determined by the level of the liquid within the tank into which the pipe structure is immersed, comprising:

throttling means connected to said pipe structure operable to effect communication between the lower end of the pipe structure and the interior of the surrounding tank for damping the movements of said float-type transmitter, said throttling means including continuous channel means producing a predetermined flow resistance, said channel means being provided with a central annular space and at least three concentrically arranged circularly shaped ring sections, of which the innermost is in communication with said central annular space by an approximately radial groove, and the outermost section discharges into the fuel tank by a curved channel portion, and approximately radially extending groove sections connecting respective circularly shaped sections.

References Cited by the Examiner

UNITED STATES PATENTS

| | | | |
|---|---|---|---|
| 1,182,672 | 6/1916 | Frame | 73—309 X |
| 1,326,578 | 12/1919 | Curtis | 200—84 |
| 1,779,353 | 10/1930 | Becker | 73—322 X |
| 2,564,676 | 8/1951 | Crouse | 73—320 |

ISAAC LISANN, *Primary Examiner.*

H. N. HAROIAN, *Assistant Examiner.*